(12) United States Patent
Komuro et al.

(10) Patent No.: US 12,233,891 B2
(45) Date of Patent: Feb. 25, 2025

(54) VEHICLE CONTROL APPARATUS

(71) Applicant: SUBARU CORPORATION, Tokyo (JP)

(72) Inventors: Masaki Komuro, Tokyo (JP); Shigemoto Horie, Tokyo (JP); Shin Sawano, Tokyo (JP); Shinya Sagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 375 days.

(21) Appl. No.: 17/826,995

(22) Filed: May 27, 2022

(65) Prior Publication Data

US 2022/0396282 A1 Dec. 15, 2022

(30) Foreign Application Priority Data

Jun. 9, 2021 (JP) .................. 2021-096484

(51) Int. Cl.
*B60W 50/10* (2012.01)
*B60W 40/09* (2012.01)
*B60W 40/105* (2012.01)

(52) U.S. Cl.
CPC ............ *B60W 50/10* (2013.01); *B60W 40/09* (2013.01); *B60W 40/105* (2013.01); *B60W 2510/105* (2013.01); *B60W 2540/30* (2013.01)

(58) Field of Classification Search
None
See application file for complete search history.

(56) References Cited

U.S. PATENT DOCUMENTS

| | | | |
|---|---|---|---|
| 2005/0096822 A1 | 5/2005 | Aoki | |
| 2007/0105679 A1* | 5/2007 | Tabata | B60K 6/445 475/5 |
| 2019/0152469 A1* | 5/2019 | Kim | B60K 6/52 |
| 2020/0269830 A1* | 8/2020 | Akita | B60K 6/48 |

FOREIGN PATENT DOCUMENTS

| | | |
|---|---|---|
| JP | 3685146 B2 | 8/2005 |
| JP | 4376034 B2 | 12/2009 |
| JP | 5098338 B2 | 12/2012 |

* cited by examiner

*Primary Examiner* — Peter D Nolan
*Assistant Examiner* — Jacob Kent Besteman-Street
(74) *Attorney, Agent, or Firm* — Rimon P.C.

(57) ABSTRACT

A vehicle control apparatus includes an electric motor, an engine, and a control system. The control system executes a first speed mode or a second speed mode as a speed mode of the transmission on the basis of a driving operation performed by a driver, sets a speed ratio on a lower side in the second speed mode than in the first speed mode in a case where an accelerator operation performed by the driver is cancelled, executes a first assist mode or a second assist mode as an assist mode in which the electric motor is brought into a power-running state, and switches the assist mode to the second assist mode in a case where the amount of the accelerator operation is increased greater than a starting threshold while the second speed mode is being executed.

13 Claims, 16 Drawing Sheets

VEHICLE CONTROL APPARATUS

CROSS-REFERENCE TO RELATED APPLICATIONS

The present application claims priority from Japanese Patent Application No. 2021-0096484 filed on Jun. 9, 2021, the entire contents of which are hereby incorporated by reference.

BACKGROUND

The technology relates to a vehicle control apparatus to be mounted in a hybrid vehicle.

A hybrid vehicle including an engine and an electric motor is provided with a transmission such as a continuously variable transmission or an automatic transmission. References are made to Japanese Patent Nos. 5098338, 3685146, and 4376034, for example. When a driver who drives the hybrid vehicle depresses the accelerator pedal to accelerate the hybrid vehicle, the transmission coupled to the engine is controlled to a low side, and the electric motor is brought into a power-running state to assist the engine. This increases driving power of the hybrid vehicle and enhances the acceleration performance of the hybrid vehicle.

SUMMARY

An aspect of the technology provides a vehicle control apparatus including an electric motor, a transmission, an engine, and a control system. The electric motor is coupled to a first wheel, a second wheel, or both of a hybrid vehicle. The engine is coupled to the first wheel, the second wheel, or both via the transmission. The control system includes a processor and memory that are communicably coupled to each other, and is configured to control the electric motor and the transmission. The control system is configured to execute a first speed mode or a second speed mode as a speed mode of the transmission on the basis of a driving operation performed by a driver who drives the hybrid vehicle, set a speed ratio on a lower side in the second speed mode than in the first speed mode in a case where an accelerator operation performed by the driver is cancelled, execute a first assist mode or a second assist mode having greater power-running torque greater than the first assist mode as an assist mode in which the electric motor is brought into a power-running state, and switch the assist mode to the second assist mode in a case where the amount of the accelerator operation performed by the driver is increased greater than a starting threshold while the second speed mode is being executed.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
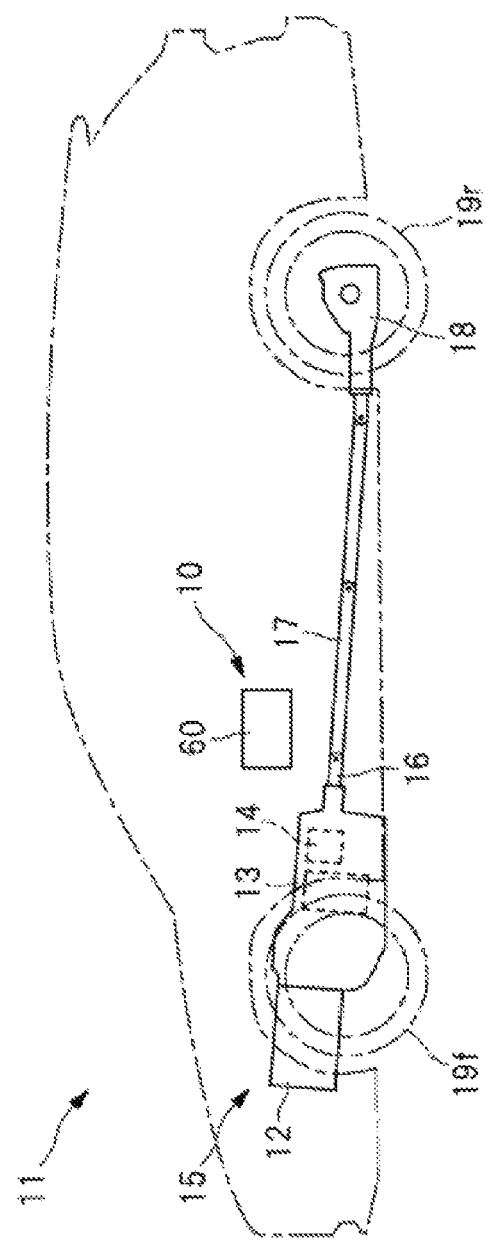
FIG. 1 is a diagram illustrating a configuration example of a hybrid vehicle including a vehicle control apparatus according to one example embodiment of the technology.

To enhance the acceleration performance of a hybrid vehicle, it is important to increase the torque and output of an electric motor. However, increasing the torque and output of the electric motor can result in an increase in size and cost of the electric motor and an increase in size and cost of a battery. Therefore, it has been desired to enhance the acceleration performance of the hybrid vehicle by appropriately controlling a transmission and the electric motor of the hybrid vehicle while reducing the sizes and costs of the electric motor and the battery.

It is desirable to enhance the acceleration performance of a hybrid vehicle by appropriately controlling a transmission and an electric motor.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Overall Configuration of Vehicle Control Apparatus]

FIG. 1 illustrates a configuration example of a hybrid vehicle 11 including a vehicle control apparatus 10 according to one example embodiment of the technology. As illustrated in FIG. 1, the hybrid vehicle 11 may include a power train 15. The power train 15 may include an engine 12, a continuously variable transmission 13, and a motor generator 14. In one embodiment, the continuously variable transmission 13 may serve as a "transmission". In one embodiment, the motor generator 14 may serve as an "electric motor". The power train 15 may also be provided with an output shaft 16. The output shaft 16 may be coupled to rear wheels 19r via a propeller shaft 17 and a differential mechanism 18. In the example illustrated in FIG. 1, the power train 15 may be a rear-wheel drive power train for driving the rear wheels 19r. However, the power train 15 should not be limited to this example. For example, the power train 15 may be a front-wheel drive power train for driving front wheels 19f, or an all-wheel drive power train for driving both the front wheels 19f and the rear wheels 19r. In one embodiment, the rear wheel 19r may serve as a "first wheel". In one embodiment, the front wheel 19f may serve as a "second wheel".

Figure 2:
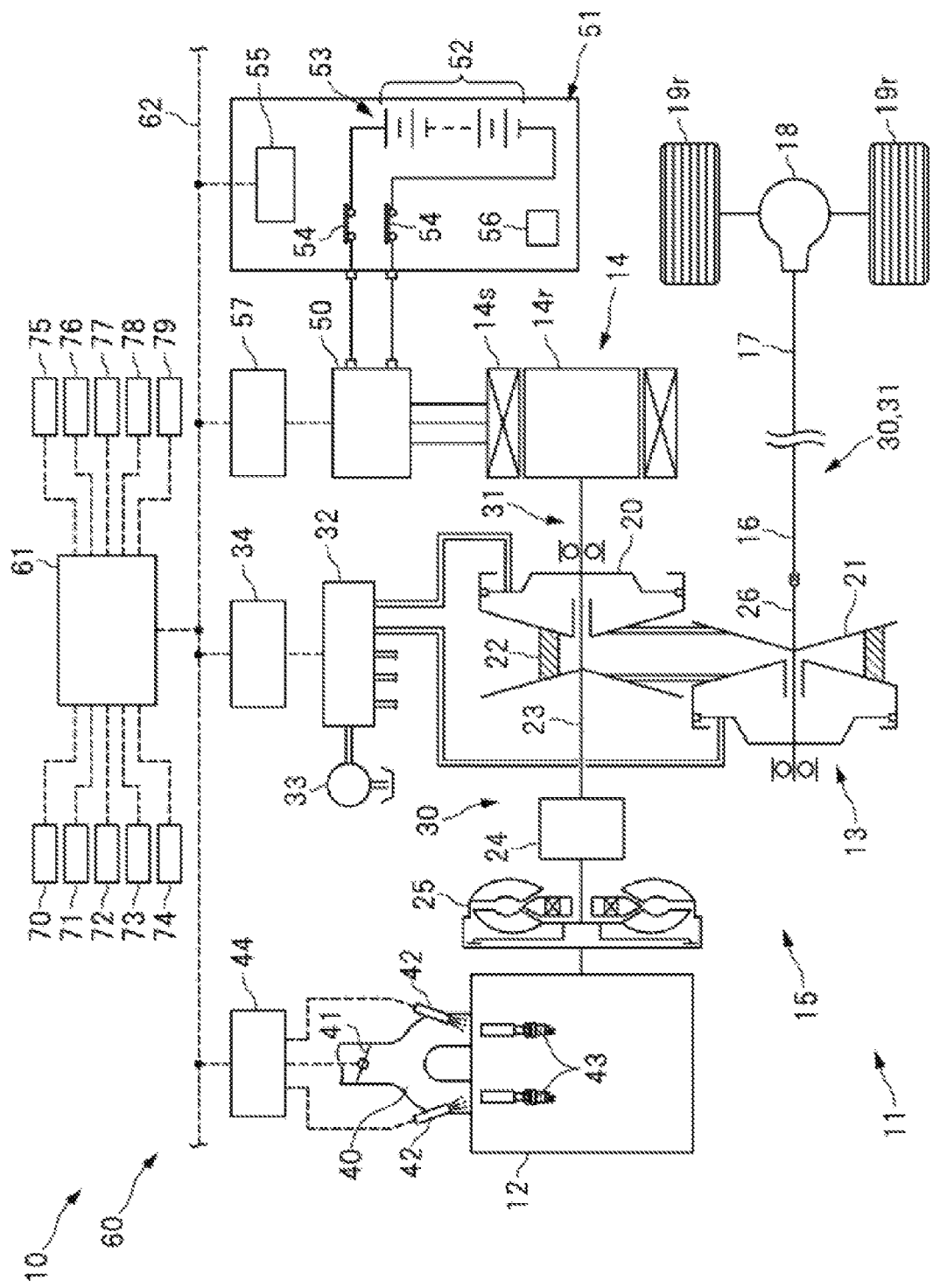
FIG. 2 is a diagram illustrating a configuration example of the vehicle control apparatus.

FIG. 2 illustrates a configuration example of the vehicle control apparatus 10. As illustrated in FIG. 2, the power train 15 may include the continuously variable transmission 13. The continuously variable transmission 13 may include a primary pulley 20, a secondary pulley 21, and a drive chain 22. The primary pulley 20 may be supported by a primary shaft 23. The engine 12 may be coupled to one side of the primary shaft 23 via a forward-backward travel changeover mechanism 24 and a torque converter 25. In addition, the motor generator 14 may include a rotor 14r coupled to the other side of the primary shaft 23, which supports the primary pulley 20. The secondary pulley 21 may be supported by a secondary shaft 26. The secondary shaft 26 may be coupled to the rear wheels 19r via the output shaft 16, the propeller shaft 17, and the differential mechanism 18.

As described above, the engine 12 and the rear wheels 19r may be coupled to each other via a power transmission path 30. The power transmission path 30 may include the torque converter 25, the forward-backward travel changeover mechanism 24, the continuously variable transmission 13, the propeller shaft 17, the differential mechanism 18, and other components. That is, the rear wheels 19r may be coupled to the engine 12 via the continuously variable transmission 13. Further, the motor generator 14 and the rear wheel 19r may be coupled to each other via a power transmission path 31. The power transmission path 31 may include the continuously variable transmission 13, the propeller shaft 17, the differential mechanism 18, and other components. The forward-backward travel changeover mechanism 24 may include a forward clutch, a reverse brake, and a planetary gear train, and other components that are not illustrated in the drawings. The forward-backward travel changeover mechanism 24 may switch a direction in which the primary pulley 20 rotates.

The power train 15 may also be provided with a valve unit 32 to control the continuously variable transmission 13, the torque converter 25, the forward-backward travel changeover mechanism 24 and other components. The valve unit 32 may include, for example, a plurality of magnetic valves and oil passages. In addition, the valve unit 32 may be coupled to an oil pump 33. The oil pump 33 may be driven by the engine 12, for example. The valve unit 32 may control, for example, a supply destination and the pressure of hydraulic oil discharged from the oil pump 33 to thereby supply the hydraulic oil to the continuously variable transmission 13, the torque converter 25, the forward-backward travel changeover mechanism 24, and other components. To control the continuously variable transmission 13 and other components via the valve unit 32, the valve unit 32 may be coupled to a speed control unit 34.

The engine 12 may be provided with an intake manifold 40. The intake manifold 40 may include a throttle valve 41. The throttle valve 41 may regulate an intake air amount. The engine 12 may also include an injector 42 and an ignition device 43. The injector 42 may inject a fuel into an intake port or a cylinder. The ignition device 43 may include, for example, an ignitor or an ignition plug. To control the engine 12 via the throttle valve 41 and other components, the throttle valve 41, the injector 42, the ignition device 43, and other components of the engine 12 may be coupled to an engine control unit 44.

The motor generator 14 may include a stator 14s coupled to a battery pack 51 via an inverter 50. The battery pack 51 may include a battery module 53 and a main relay 54 coupled to the battery module 53. The battery module 53 may include a plurality of battery cells 52. In one embodiment, the battery module 53 may serve as an "electric power storage device". The battery pack 51 may also include a battery control unit 55 and a battery sensor 56. The battery control unit 55 may monitor charging and discharging of the battery module 53. The battery sensor 56 may detect, for example, a charging current, a discharging current, and a terminal voltage. The battery control unit 55 may have a function of calculating a state of charge (SOC) of the battery module 53 on the basis of, for example, the charging current, the discharging current, and the terminal voltage detected by the battery sensor 56. Note that the SOC of the battery module 53 may refer to the rate indicating the remaining amount of electric power in the battery module 53. That is, the SOC of the battery module 53 may be the rate of a charged amount to the full charge capacity of the battery module 53.

To control the motor generator 14 via the inverter 50, the inverter 50 may be coupled to a motor control unit 57. The motor control unit 57 may control an energization state of the stator 14s by controlling the inverter 50, which includes a plurality of switching elements and other elements, to thereby control the torque and the revolution speed of the motor generator 14. To bring the motor generator 14 into a power running state, electric power may be supplied from the battery module 53 to the stator 14s via the inverter 50. In contrast, to bring the motor generator 14 into a power generation state, electric power may be supplied from the stator 14s to the battery module 53 via the inverter 50.

[Control System]

As illustrated in FIG. 2, the vehicle control apparatus 10 may include a control system 60 that controls the power train 15 and other components. The control system 60 may include a plurality of electronic control units. Examples of the electronic control units in the control system 60 may include the speed control unit 34, the engine control unit 44, the battery control unit 55, and the motor control unit 57 that are described above, and a vehicle control unit 61. The vehicle control unit 61 may output control signals to the speed control unit 34, the engine control unit 44, the battery control unit 55, and the motor control unit 57. The speed control unit 34, the engine control unit 44, the battery control unit 55, the motor control unit 57, and the vehicle control unit 61 may be communicably coupled to each other via an in-vehicle network 62, such as a controller area network (CAN) or a local interconnect network (LIN). The vehicle control unit 61 may set operation targets of the engine 12, the continuously variable transmission 13, and other components on the basis of input information received from the speed control unit 34, the engine control unit 44, the battery control unit 55, the motor control unit 57, and various sensors described below. Thereafter, the vehicle control unit 61 may generate control signals on the basis of the operation targets of the engine 12, the continuously variable transmission 13, and other components, and output the control signals to the speed control unit 34, the engine control unit 44, the battery control unit 55, and the motor control unit 57.

Examples of sensors coupled to the vehicle control unit 61 may include a vehicle speed sensor 70, an acceleration sensor 71, an acceleration sensor 72, and an engine revolution sensor 73. The vehicle speed sensor 70 may detect a vehicle speed which is a traveling speed of the hybrid vehicle 11. The acceleration sensor 71 may detect forward/backward acceleration exerted in a front/back direction of the hybrid vehicle 11. The acceleration sensor 72 may detect lateral acceleration exerted in a width direction of the hybrid vehicle 11. The engine revolution sensor 73 that detects an engine revolution number which is a revolution speed of the engine 12. Other examples of sensors coupled to the vehicle control unit 61 may include an accelerator sensor 74, a brake sensor 75, and a steering angle sensor 76. The accelerator sensor 74 may detect an operational state of an accelerator pedal. The brake sensor 75 may detect an operational state of a brake pedal. The steering angle sensor 76 may detect the steering angle of a steering wheel. Still other examples of sensors coupled to the vehicle control unit 61 may include a primary revolution sensor 77 and a secondary revolution sensor 78. The primary revolution sensor 77 may detect the revolution speed of the primary pulley 20. The secondary revolution sensor 78 may detect the revolution speed of the secondary pulley 21. In addition, a start switch 79 may be coupled to the vehicle control unit 61. The start switch 79 may be operated by a driver who drives the hybrid vehicle 11 to start the control system 60.

Figure 3:
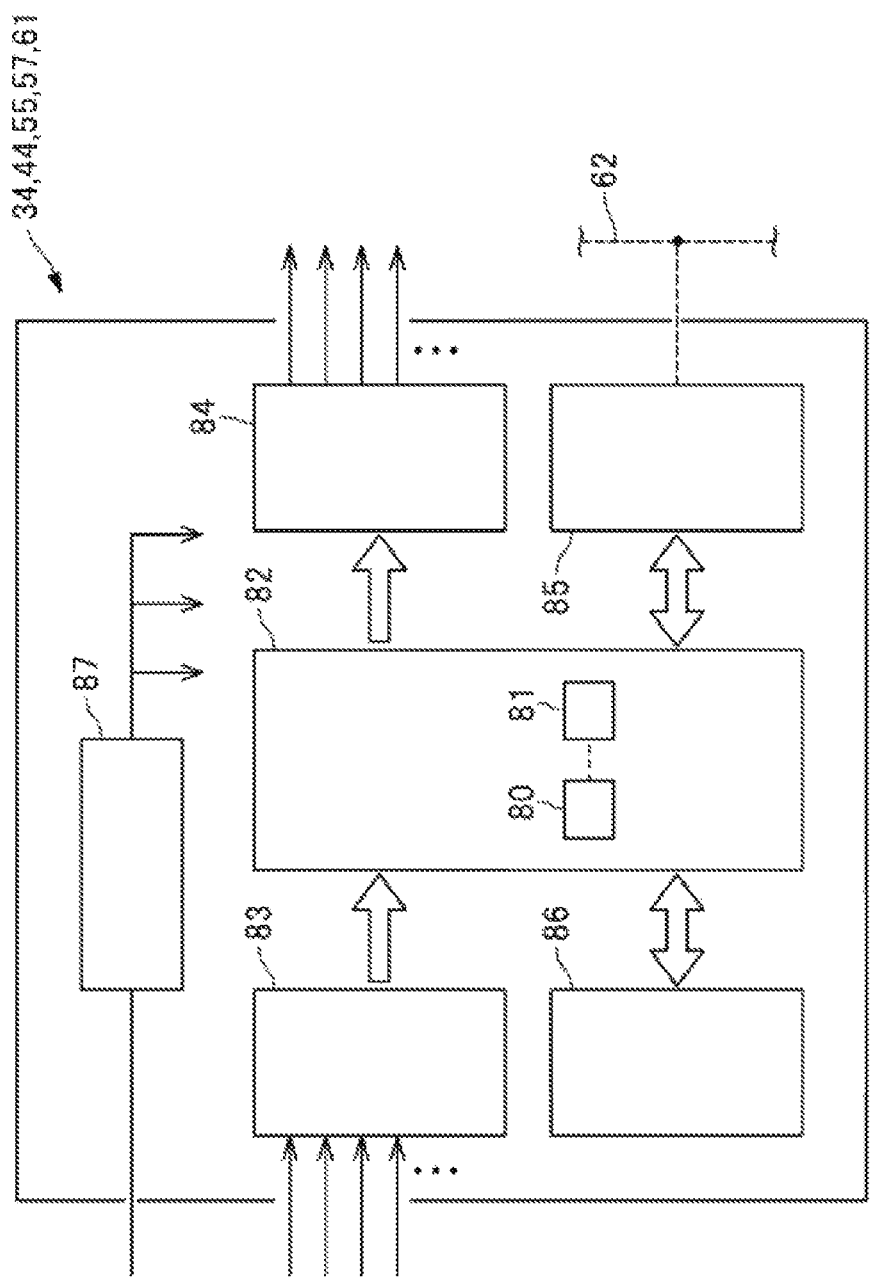
FIG. 3 is a diagram schematically illustrating a basic configuration of each control unit.

FIG. 3 schematically illustrates a basic configuration of each of the speed control unit 34, the engine control unit 44, the battery control unit 55, the motor control unit 57, and the vehicle control unit 61. As illustrated in FIG. 3, the speed control unit 34, the engine control unit 44, the battery control unit 55, the motor control unit 57, and the vehicle control unit 61 may each include a microcontroller 82. The microcontroller 82 may include, for example, a processor 80 and a memory 81. The memory 81 may store a predetermined program, and the processor 80 may execute a command set of the program. The processor 80 and the memory 81 may be communicably coupled to each other. In the example illustrated in FIG. 3, the microcontroller 82 may include one processor 80 and one memory 81. However, the microcontroller 82 should not be limited to this example. Alternatively, the microcontroller 82 may include a plurality of processors 80 and a plurality of memories 81.

The speed control unit 34, the engine control unit 44, the battery control unit 55, the motor control unit 57, and the vehicle control unit 61 may each include an input conversion circuit 83, a drive circuit 84, a communication circuit 85, an external memory 86, a power circuit 87, and other components. The input conversion circuit 83 may convert signals received from various sensors into signals receivable by the microcontroller 82. The drive circuit 84 may generate drive signals for driving an actuator, such as the valve unit 32 described above, on the basis of signals outputted from the microcontroller 82. The communication circuit 85 may convert signals outputted from the microcontroller 82 into communication signals to be transmitted to the other control units. The communication circuit 85 may also convert communication signals received from the other control units into signals receivable by the microcontroller 82. The power circuit 87 may supply a stable power voltage to the microcontroller 82, the input conversion circuit 83, the drive circuit 84, the communication circuit 85, the external memory 86, and other components. The external memory 86 may be, for example, a non-volatile memory that stores data to be held even while electric power is not supplied thereto.

[Speed Control]

In the following, speed control performed by the control system 60 is described. The control system 60 may control the continuously variable transmission 13 in two speed modes: an ordinary speed mode and an adaptive speed mode. The ordinary speed mode may be executed for ordinary traveling of the hybrid vehicle 11. In one embodiment, the ordinary speed mode may serve as a "first speed mode". The adaptive speed mode may be executed for sport traveling of the hybrid vehicle 11. In one embodiment, the adaptive speed mode may serve as a "second speed mode". In a case where a driving intensity (to be described later) imparted by the driver is less than a predetermined threshold D1, the ordinary speed mode may be selected and executed. In contrast, in a case where the driving intensity imparted by the driver is greater than the predetermined threshold D1, the adaptive speed mode may be selected and executed. The term "driving intensity" used herein may refer to an index calculated by the control system 60 on the basis of a driving operation performed by the driver. That is, the driving intensity may indicate the degree of intensity of a driving operation performed by the driver. In a case where the driving operation, such as an accelerator operation, is performed softly, the control system 60 may calculate a small driving intensity. In contrast, in a case where the driving operation, such as an accelerator operation, is not performed softly, the control system 60 may calculate a large driving intensity. Note that the control system 60 may calculate and update the driving intensity in a predetermined cycle on the basis of the driving operation, such as an accelerator operation and a brake operation, performed for a predetermined period of time or over a predetermined travel distance.

For example, a large driving intensity may be calculated in a case where the operation amount of the accelerator pedal (hereinafter referred to as an accelerator position) is large or where the operation speed of the accelerator pedal is high. A large driving intensity may be calculated also in a case where the operation amount of the brake pedal is large, where the operation speed of the brake pedal is high, where the operation amount of the steering wheel is large, or where the operation speed of the steering wheel is high. Further, a large driving intensity may be calculated also in a case where the vehicle speed is high, where the forward/backward acceleration rate is high, or where the lateral acceleration rate is high. In contrast, a small driving intensity may be calculated in a case where the accelerator position is small or where the operation speed of the accelerator pedal is low. A small driving intensity may be calculated also in a case where the operation amount of the brake pedal is small, where the operation speed of the brake pedal is low, where the operation amount of the steering wheel is small, or where the operation speed of the brake pedal is low. Further, a small driving intensity may be calculated also in a case where the vehicle speed is low, where the forward/backward acceleration rate is low, or where the lateral acceleration rate is low.

<Speed Control: Ordinary Speed Mode>

Figure 4:
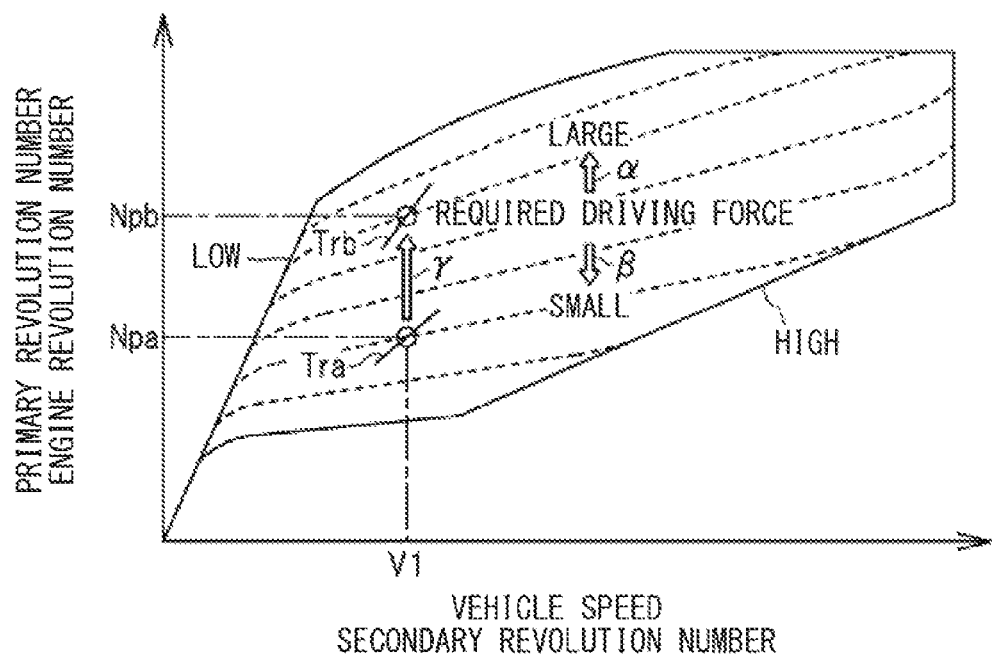
FIG. 4 is a diagram illustrating a speed characteristic map used in an ordinary speed mode.

In the following, the ordinary speed mode is described. FIG. 4 illustrates a speed characteristic map used in the ordinary speed mode. The control system 60 may set a target speed ratio to be used in the ordinary speed mode on the basis of the accelerator position and the vehicle speed by referring to the speed characteristic map. As illustrated in FIG. 4, the speed characteristic map may have a characteristic line LOW and a characteristic line HIGH. The characteristic line LOW may indicate a maximum speed ratio on a low side. The characteristic line HIGH may indicate a minimum speed ratio on a high side. The speed characteristic map may also have a plurality of other characteristic lines, as indicated by broken lines. These characteristic lines may correspond to respective accelerator positions, i.e., respective required driving forces. Note that the term "speed ratio" may refer to the ratio of the revolution speed of the primary pulley 20 (i.e., a primary revolution number Np) to the revolution speed of the secondary pulley 21 (i.e., a secondary revolution number Ns) (i.e., Np/Ns). Accordingly, the speed ratio may be set on a lower side as the value of the speed ratio increases, whereas the speed ratio may be set on a higher side as the value of the speed ratio decreases.

As illustrated in FIG. 4, a characteristic line to be selected may be shifted in the direction indicated by an arrow α as the accelerator position is increased by depressing the accelerator pedal, i.e., as the driving force required to the hybrid vehicle 11 increases. In contrast, a characteristic line to be selected may be shifted in the direction indicated by an arrow β as the accelerator position is decreased by releasing the accelerator pedal, i.e., as the driving force required to the hybrid vehicle 11 decreases. For example, in a case where the accelerator pedal is depressed while the hybrid vehicle 11 is traveling at a vehicle speed V1, a target primary revolution number may be increased from "Npa" to "Npb", and a target speed ratio of the continuously variable transmission 13 may be continuously controlled from "Tra" toward "Trb" on the low side, as indicated by an arrow γ. As described above, in the ordinary speed mode, the target speed ratio may be set on the basis of the accelerator position and the vehicle speed, and the groove widths of the primary pulley 20 and the secondary pulley 21 may be controlled toward the target speed ratio.

<Speed Control: Adaptive Speed Mode>

Figure 5:
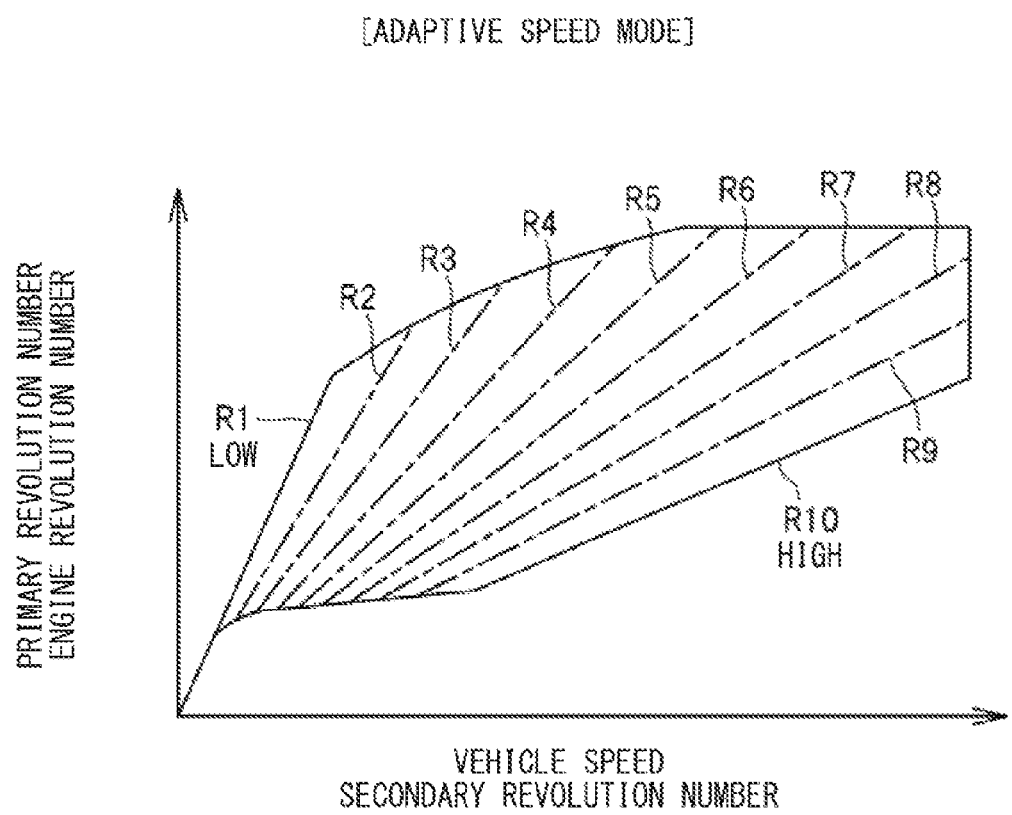
FIG. 5 is a diagram illustrating examples of fixed speed ratios used in an adaptive speed mode.
Figure 6:
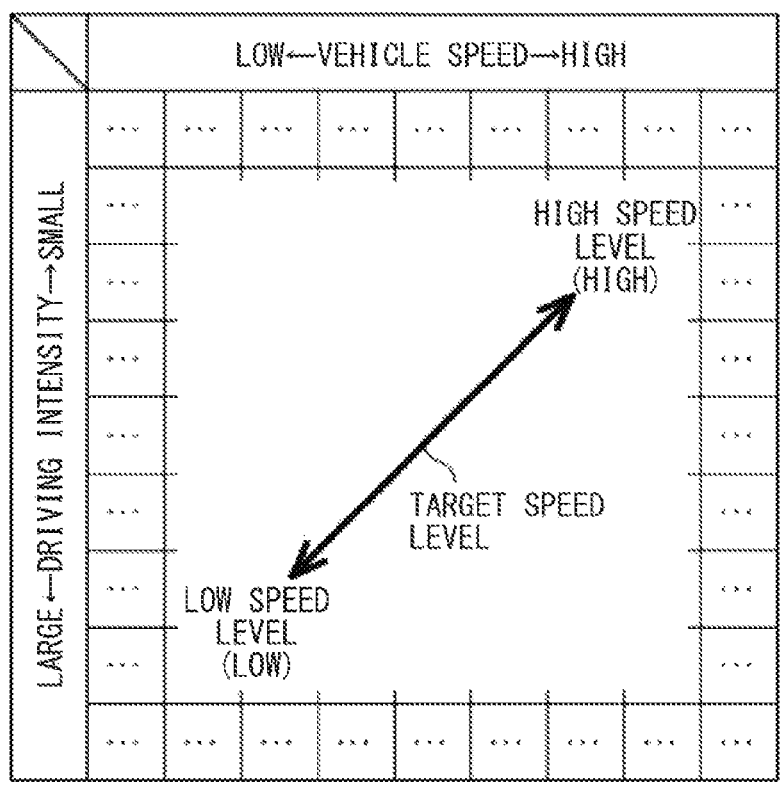
FIG. 6 is a diagram illustrating an exemplary target speed level used in the adaptive speed mode.

In the following, the adaptive speed mode is described. FIG. 5 illustrates examples of fixed speed ratios used in the adaptive speed mode, and FIG. 6 illustrates an exemplary target speed level used in the adaptive speed mode. As illustrated in FIG. 5, a plurality of fixed speed ratios R1 to R10 may be set in the adaptive speed mode as target speed ratios or target speed levels of the speed mode. In addition, as illustrated in FIG. 6, the control system 60 may set the target speed level on the basis of the vehicle speed and the driving intensity. That is, the control system 60 may set the target speed level on a higher speed level side (on the high side) as the vehicle speed increases, whereas may set the target speed level on a lower speed level side (on the low side) as the vehicle speed decreases. Further, the control system 60 may set the target speed level on a lower speed level side (on the low side) as the driving intensity increases, whereas may set a target speed level on a higher speed level side (on the high side) as the driving intensity decreases.

Figure 7:
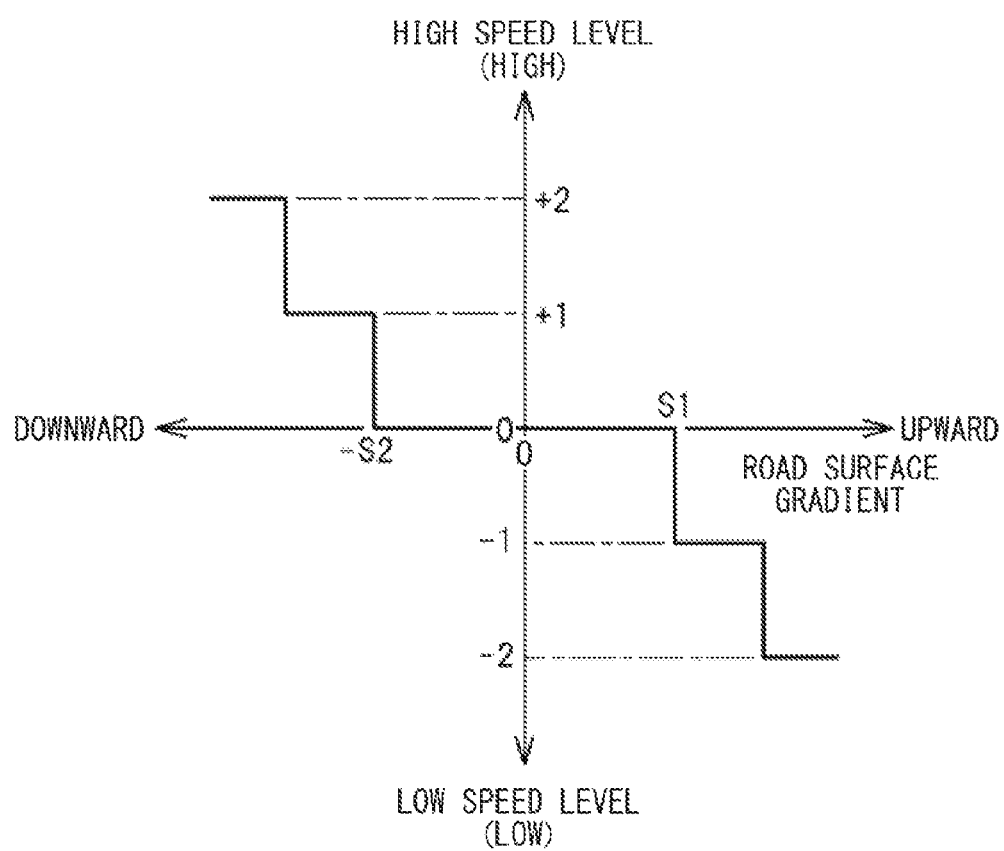
FIG. 7 is a diagram illustrating an exemplary correction of the target speed level.

Further, in the adaptive speed mode, the target speed level may be corrected on the basis of a road surface gradient. FIG. 7 illustrates an exemplary correction of the target speed level. As illustrated in FIG. 7, the target speed level may be corrected to a lower speed level side as the upward gradient of a traveling road surface increases, whereas may be corrected to a higher speed level side as the downward gradient of the traveling road surface increases. For example, in a case where the upward gradient of the traveling road surface is "S1", the target speed level set on the basis of FIG. 6 may be corrected to the low speed side by one level. In contrast, in a case where the downward gradient of the traveling road surface is "-S2", the target speed level set on the basis of FIG. 6 may be corrected to the high speed level side by one level. Note that the control system 60 may calculate the gradient of the traveling road surface on the basis of a frontward/backward acceleration rate detected by the acceleration sensor 71.

Figure 8:
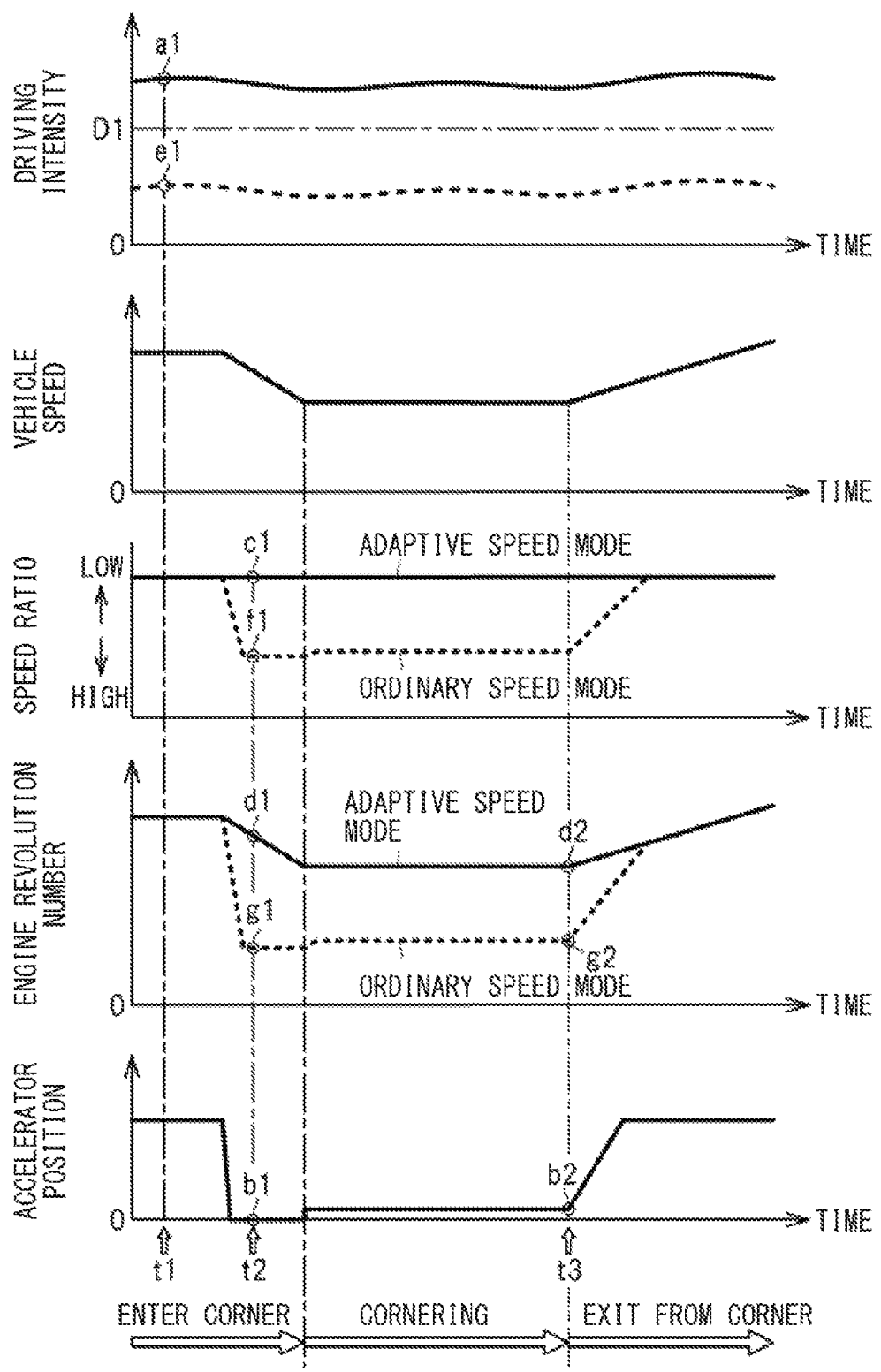
FIG. 8 is a timing chart illustrating an exemplary transition of an engine revolution number in the adaptive speed mode.

FIG. 8 is a timing chart illustrating an exemplary transition of an engine revolution number. FIG. 8 illustrates a traveling state of the hybrid vehicle 11 from the time when the hybrid vehicle 11 enters a corner to the time when the hybrid vehicle 11 exits from the corner. For example, in a case where the driving intensity calculated on the basis of the accelerator operation and other factors is greater than a predetermined threshold D1 at a time t1 as indicated by a reference sign a1 in FIG. 8, the adaptive speed mode may be executed as the speed mode of the continuously variable transmission 13. Thereafter, when the hybrid vehicle 11 enters the corner at a time t2, the driver may release the accelerator pedal to decrease the accelerator position, as indicated by a reference sign b1.

Even in a case where the accelerator position decreases as described above, the target speed level in the adaptive speed mode may be set on the basis of the vehicle speed and the driving intensity, as illustrated in FIG. 6. Thus, the target speed level, i.e., the speed ratio of the continuously variable transmission 13 may be maintained, as indicated by a reference sign c1. This suppresses an excessive decrease in the engine revolution number, as indicated by a reference sign d1. Thereafter, when the hybrid vehicle 11 exits from the corner at a time t3 after cornering, the driver may depress the accelerator pedal to start increasing the accelerator position, as indicated by a reference sign b2. In this case, the engine revolution number may be kept at a relatively high level during the cornering due to the adaptive speed mode, as indicated by a reference sign d2. This enhances the acceleration responsivity of the hybrid vehicle 11 at the time of exit from the corner.

In contrast, in a case where the ordinary traveling mode is executed from the time when the hybrid vehicle 11 enters the corner to the time when the hybrid vehicle 11 exits from the corner, the engine revolution number may be greatly decreased during the cornering, as indicated by a broken line in FIG. 8. This makes it difficult to enhance the acceleration responsivity of the hybrid vehicle 11 at the time of exit from the corner. For example, in a case where the driving intensity calculated on the basis of the accelerator operation and other factors is less than the predetermined threshold D1 at the time t1 as indicated by a reference sign e1 in FIG. 8, the ordinary speed mode may be executed as the speed mode of the continuously variable transmission 13. Thereafter, when the hybrid vehicle 11 enters the corner at the time t2, the driver may release the accelerator pedal to decrease the accelerator position, as indicated by a reference sign b1.

As described above with reference to FIG. 4, the target speed ratio in the ordinary speed mode may be set on the basis of the accelerator position, i.e., the required driving force. Accordingly, in a case where the accelerator position is decreased, the target speed ratio may be upshifted to the high side, as indicated by a reference sign f1, and the engine revolution number may be greatly decreased, as indicated by a reference sign g1. Thereafter, when the hybrid vehicle 11 exits from the corner at the time t3 after cornering, the driver may depress the accelerator pedal to start increasing the accelerator position, as indicated by the reference sign b2. In this case, the engine revolution number may be greatly decreased during the cornering due to the ordinary speed mode, as indicated by a reference sign g2. This reduces the acceleration responsivity of the hybrid vehicle 11 at the time of exit from the corner.

As described above, when the accelerator pedal is released, upshifting is suppressed in the adaptive speed mode, whereas upshifting is actively executed in the ordinary speed mode. That is, when the accelerator operation is cancelled by the driver, the speed ratio is set to a lower side in the adaptive speed mode than in the ordinary speed mode. Accordingly, even in a case where the accelerator operation is cancelled when the hybrid vehicle 11 enters a corner, it is possible to suppress the upshifting and maintain the engine revolution number at a relatively high level by executing the adaptive speed mode as the speed mode. This enhances the acceleration responsivity of the hybrid vehicle 11 at the time of exit from the corner.

[Assist Control]

Next, a description is given of assist control executed by the control system 60. To enhance the acceleration responsivity in the adaptive speed mode, the control system 60 executes the assist control in which the motor generator 14 is brought into a power-running state while the hybrid vehicle 11 is accelerating. In the assist control, two assist modes may be used: an ordinary assist mode and an acceleration assist mode. In the ordinary assist mode, a small target motor torque may be set. In the acceleration assist mode, a large target motor torque may be set. In one embodiment, the ordinary assist mode may serve as a "first assist mode". In one embodiment, the acceleration assist mode may serve as a "second assist mode". For example, in a condition where the required driving force to the hybrid vehicle 11 is the same between the ordinary assist mode and the acceleration assist mode, i.e., the accelerator position is the same between the ordinary assist mode and the acceleration assist mode, power-running torque of the motor generator 14 may be set to a larger value in the acceleration assist mode than in the ordinary assist mode. Note that the power-running torque of the motor generator 14 may refer to motor torque outputted from the motor generator 14 that has been brought into the power-running state.

<Assist Control: Ordinary Assist Mode>

Figure 9:
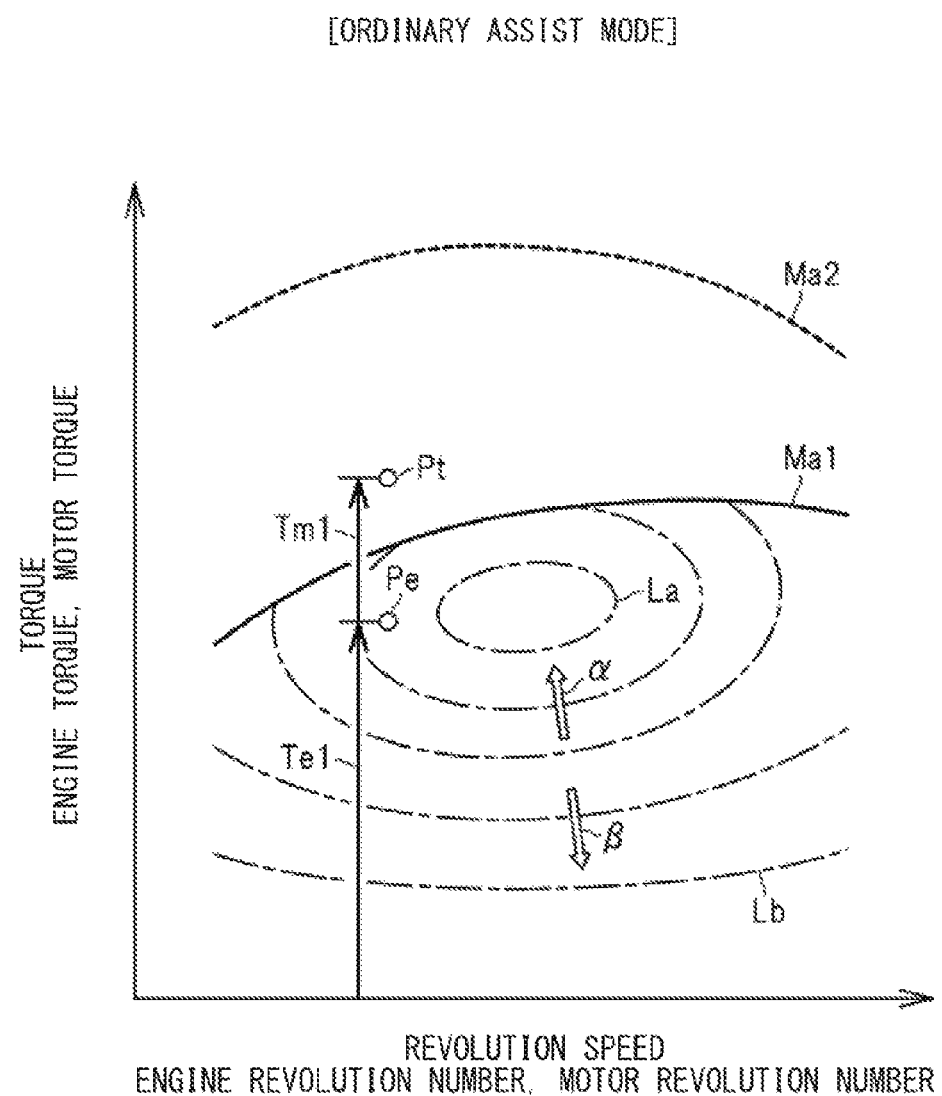
FIG. 9 is a diagram illustrating an exemplary operating point of an engine in an ordinary assist mode.

In the following, the ordinary assist mode is described. FIG. 9 is a diagram illustrating an exemplary operating point of the engine 12. FIG. 9 illustrates exemplary target engine torque and exemplary target motor torque that are set in a case where the ordinary assist mode is executed. Note that dashed-dotted lines in FIG. 9 each connect points equal to each other in heat efficiency. The heat efficiency of the engine 12 may increase toward a dashed-dotted line La, as indicated by an arrow α in FIG. 9, whereas may decrease toward a dashed-dotted line Lb, as indicated by an arrow β in FIG. 9. A solid line Ma1 in FIG. 9 may indicate maximum torque of the engine 12, and a broken line Ma2 in FIG. 9 may indicate maximum total torque of the power sources, i.e., the engine 12 and the motor generator 14.

As illustrated in FIG. 9, in a case where the ordinary assist mode is executed, the control system 60 may set a required driving force to the drive wheel (e.g., the rear wheel 19r) on the basis of the accelerator position set by the driver, and set a target operating point Pt of the power sources (i.e., the engine 12 and the motor generator 14) on the basis of the required driving force. Thereafter, the control system 60 may set a target operating point Pe of the engine 12 and target engine torque Te1 of the engine 12 to increase the heat efficiency. Thereafter, the control system 60 may set target motor torque Tm1 of the motor generator 14 so that the power sources (i.e., the engine 12 and the motor generator 14) operate at the target operating point Pt when the engine 12 is controlled to the target engine torque Te1. As described above, in a case where the ordinary assist mode is executed, the target engine torque Te1 may be set to increase the heat efficiency, following which the target motor torque Tm1 may be set to obtain a desired required driving force. This allows the engine 12 to operate in a high heat efficiency region even while the hybrid vehicle 11 is accelerating. Accordingly, it is possible to enhance the fuel economy performance of the hybrid vehicle 11.

<Assist Control: Acceleration Assist Mode>

Figure 10:
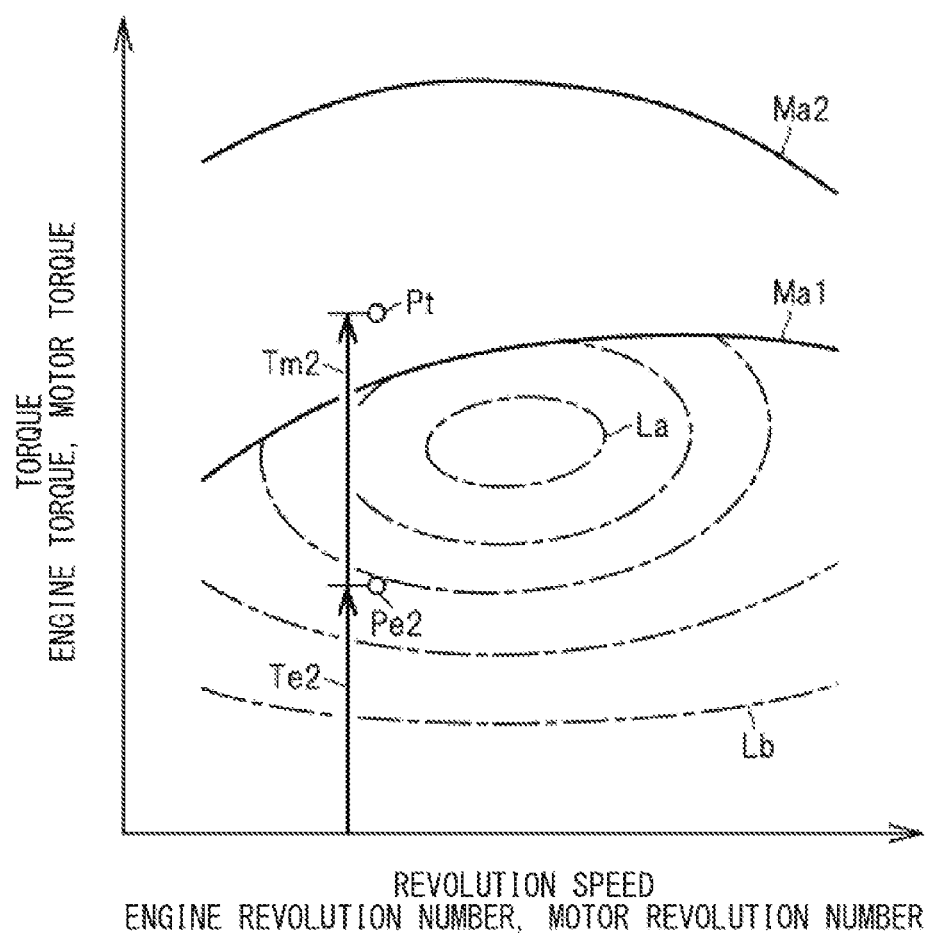
FIG. 10 is a diagram illustrating an exemplary operating point of the engine in an acceleration assist mode.
Figure 11:
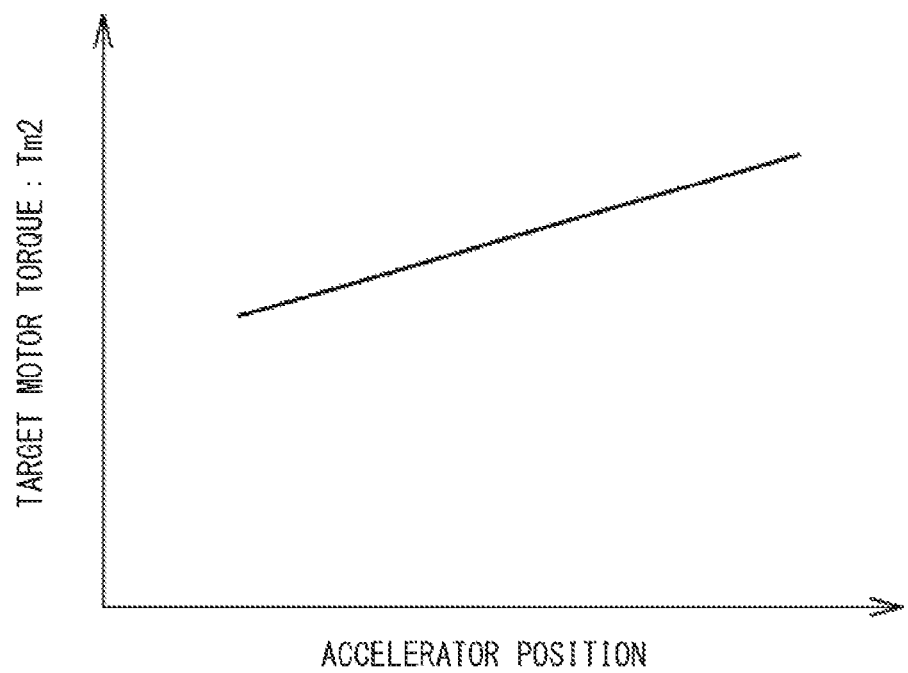
FIG. 11 is a diagram illustrating exemplary target motor torque set in the acceleration assist mode.

In the following, the acceleration assist mode is described. FIG. 10 is a diagram illustrating an exemplary operating point of the engine 12. FIG. 10 illustrates exemplary target engine torque and exemplary target motor torque that are set in a case where the acceleration assist mode is executed. FIG. 11 illustrates the exemplary target motor torque set in the acceleration assist mode. Note that the vehicle speed and the required driving force are the same between the examples illustrated in FIG. 9 and the condition illustrated in FIG. 10.

As illustrated in FIG. 10, in a case where the acceleration assist mode is executed, the control system 60 may set a required driving force to the drive wheel on the basis of the accelerator position set by the driver, and set a target operating point Pt of the power sources (i.e., the engine 12 and the motor generator 14) on the basis of the required driving force. Thereafter, the control system 60 may set target motor torque Tm2 on the basis of the accelerator position by referring to the torque map illustrated in FIG. 11. As illustrated in FIG. 11, the target motor torque Tm2 may be set to a larger value as the accelerator position increases, whereas to a smaller value as the accelerator position decreases. Thereafter, the control system 60 may set the target engine torque Te2 so that the power sources (i.e., the engine 12 and the motor generator 14) operate at the target operating point Pt when the motor generator 14 is controlled to the target motor torque Tm2. As described above, in a case where the acceleration assist mode is executed, the target motor torque Tm2 may be set on the basis of the accelerator position, following which the target engine torque Te2 may be set to obtain a desired required driving force. This allows the motor generator 14 to be used actively. Accordingly, it is possible to enhance the acceleration responsivity of the hybrid vehicle 11. Note that, in the acceleration assist mode illustrated in FIG. 10, the operating point of the engine 12 is indicated by a reference sign Pe2.

[Assist Mode Switching Control (Flowchart)]

As described above, the motor generator 14 may be used more actively in the acceleration assist mode than in the ordinary assist mode. This increases the acceleration responsivity of the hybrid vehicle 11. Accordingly, it is desirable to actively execute the acceleration assist mode in sport traveling in which the adaptive speed mode is executed. However, the execution of the acceleration assist mode can result in a large decrease in the SOC of the battery module 53. Accordingly, it has been desired to execute the acceleration assist mode contributing to an increase in the acceleration responsivity at an appropriate timing. To this end, the control system 60 may execute the acceleration assist mode contributing to an increase in the acceleration responsivity at an appropriate timing by executing assist mode switching control described below.

Figure 12:
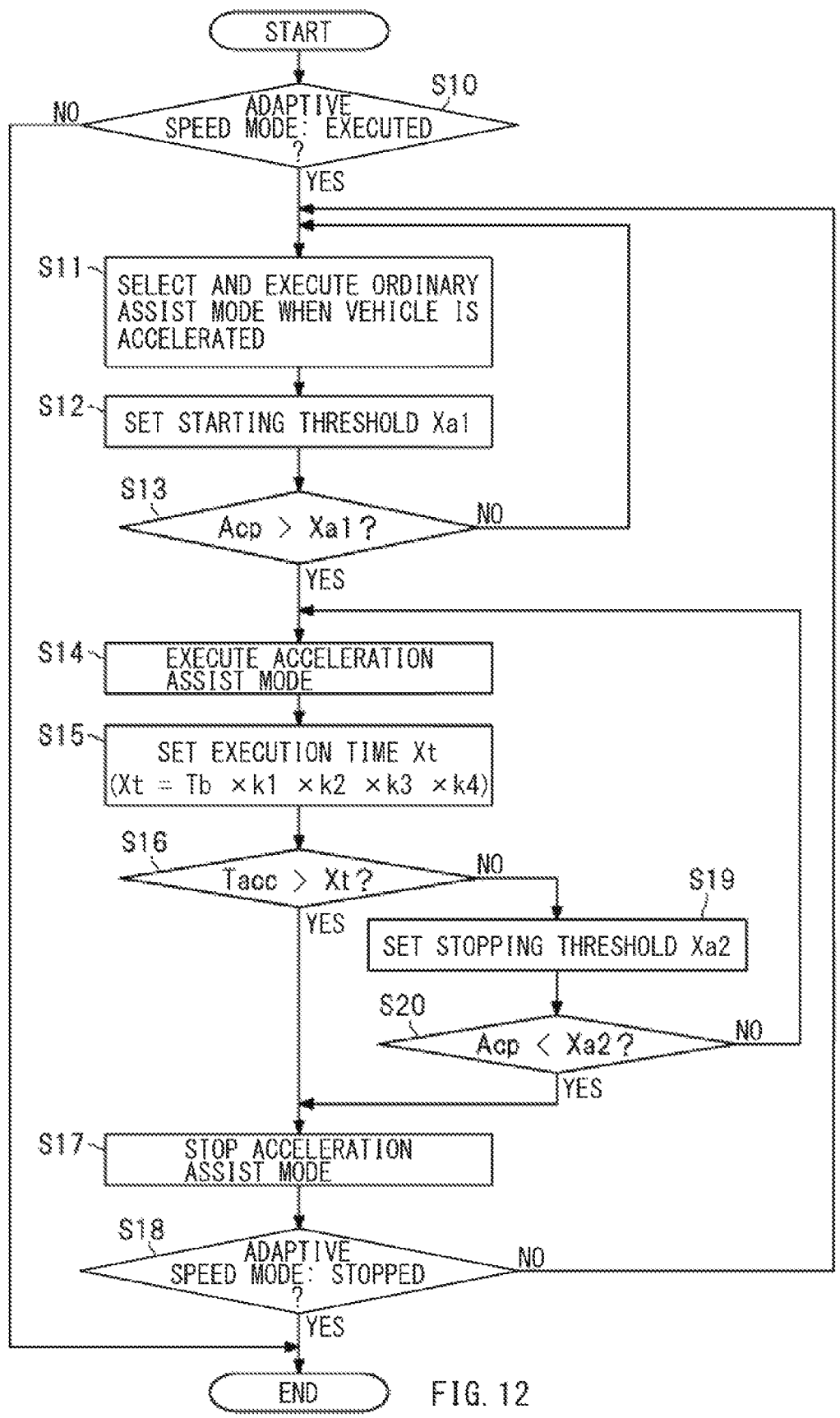
FIG. 12 is a flowchart illustrating an exemplary procedure for executing assist mode switching control.
Figure 13:
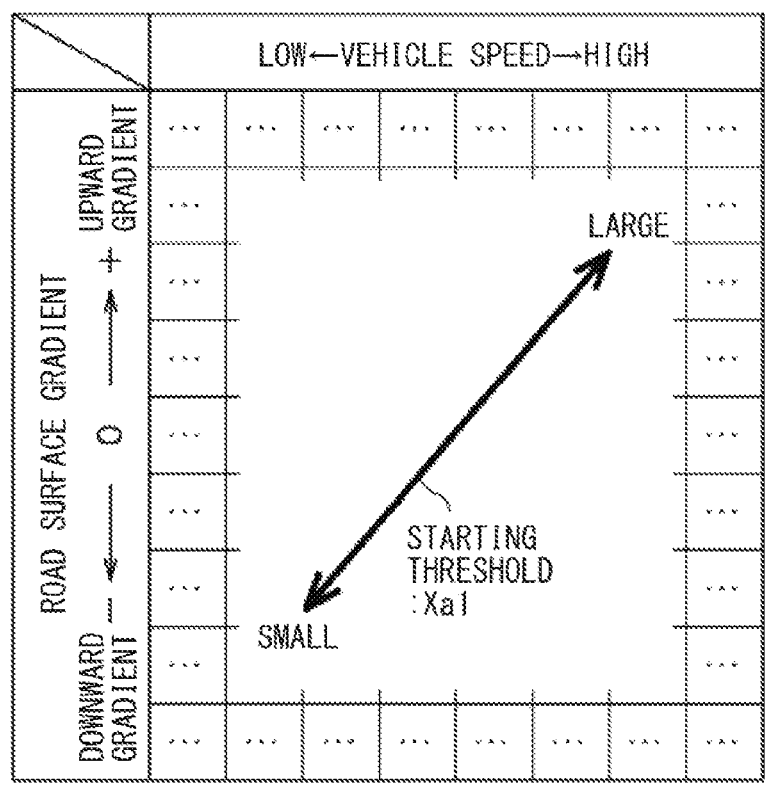
FIG. 13 is a diagram illustrating an exemplary starting threshold.
Figure 14:
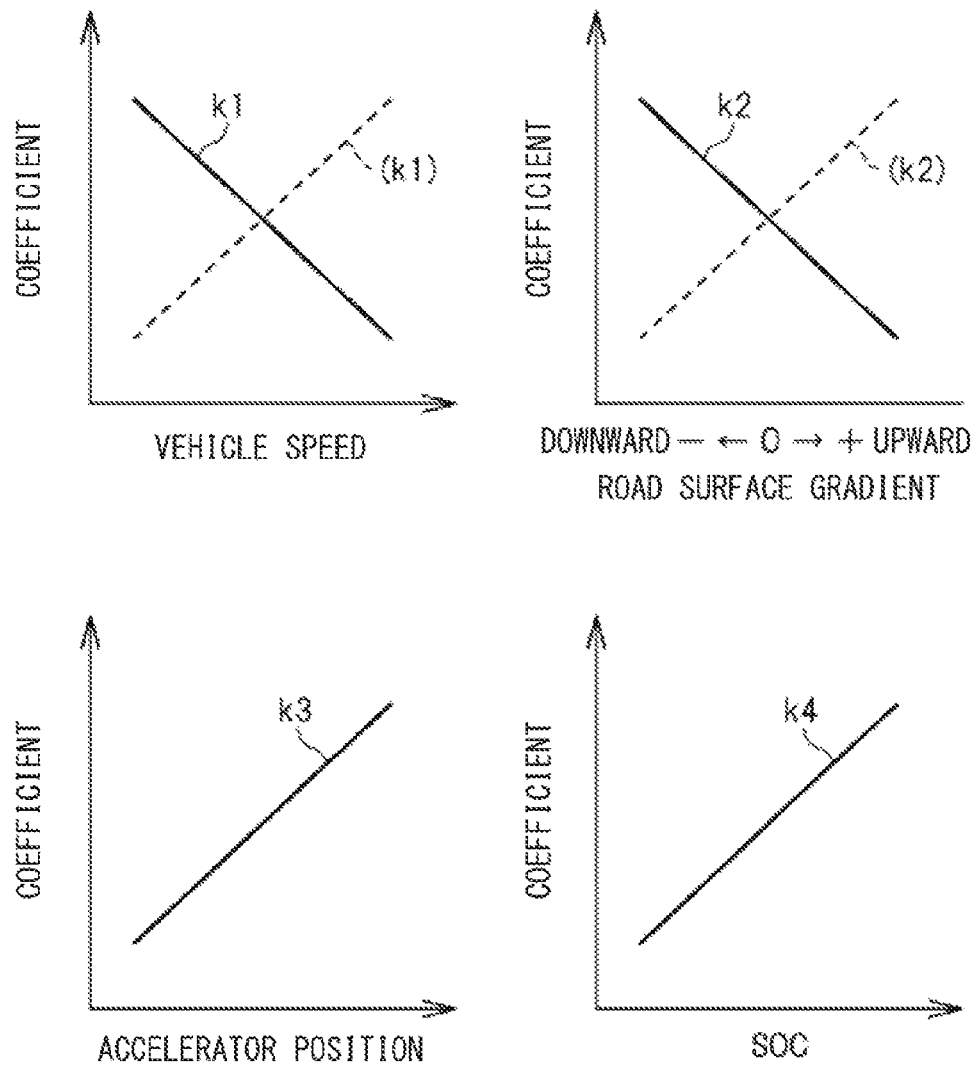
FIG. 14 is a diagram illustrating exemplary coefficients used to set an execution time.
Figure 15:
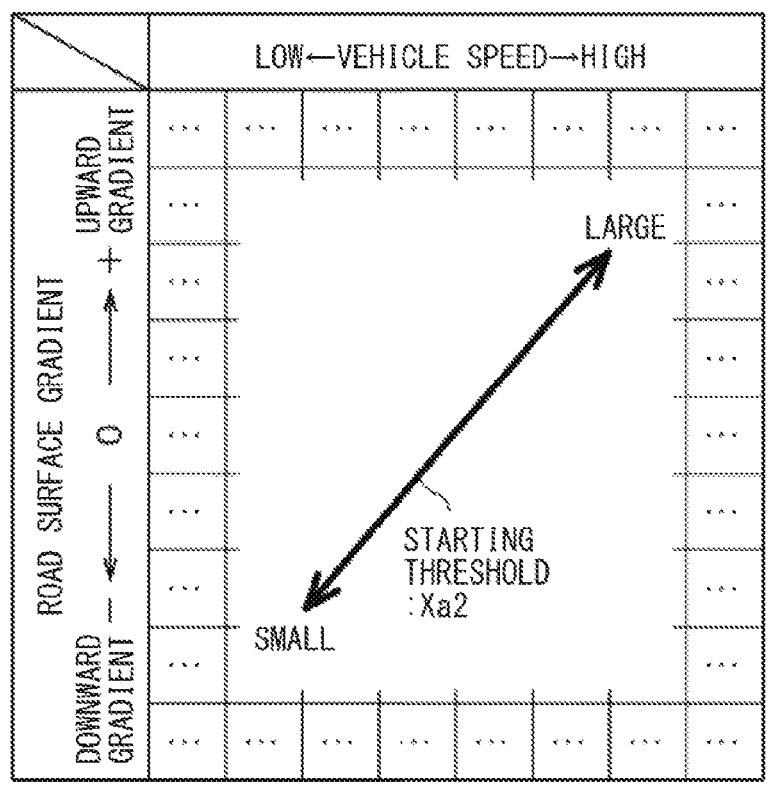
FIG. 15 is a diagram illustrating an exemplary stopping threshold.

In the following, the assist mode switching control executed by the control system 60 is described. FIG. 12 is a flowchart illustrating an exemplary procedure for the assist mode switching control. FIG. 13 illustrates an exemplary starting threshold Xa1. FIG. 14 illustrates exemplary coefficients k1 to k4 used to set an execution time Xt. FIG. 15 illustrates an exemplary stopping threshold Xa2. Each step illustrated in the flowchart of FIG. 12 indicates a process executed by the processor(s) 80 in the control system 60. Note that the assist mode switching control illustrated in FIG. 12 may be executed by the control system 60 in a predetermined cycle after the driver operates the start switch 79 to start the control system 60, which includes the vehicle control unit 61 and other components.

As illustrated in FIG. 12, it may be determined in Step S10 whether the adaptive speed mode is being executed. If it is not determined in Step S10 that the adaptive speed mode is being executed (Step S10: NO), the procedure may exit the routine of the assist mode switching control. If it is determined in Step S10 that adaptive speed mode is being executed (Step S10: YES), the procedure may proceed to Step S11. In Step S11, the ordinary assist mode may be selected as the assist mode. That is, in a case where the hybrid vehicle 11 is accelerated by depressing the accelerator pedal, the ordinary assist mode may be executed as the assist mode. Thereafter, the procedure may proceed to Step S12. In Step S12, the starting threshold Xa1 may be set on the basis of the vehicle speed and the road surface gradient, following which the procedure may proceed to Step S13. In Step S13, it may be determined whether an accelerator position Acp is greater than the starting threshold Xa1. In one embodiment, the accelerator position Acp may serve as an "amount of the accelerator operation". As illustrated in FIG. 13, the starting threshold Xa1 may be set to a larger value as the vehicle speed increases or as the upward gradient of the traveling road surface increases. That is, the starting threshold Xa1 may be set to a larger value as a traveling resistance of the hybrid vehicle 11 increases.

As illustrated in FIG. 12, if it is determined in Step S13 that the accelerator position Acp is less than or equal to the starting threshold Xa1, i.e., if it is not determined that high acceleration is required by the driver (Step S13: NO), the procedure may return to Step S11 in which the ordinary assist mode is kept selected. In contrast, if it is determined in Step S13 that the accelerator position Acp is greater than the starting threshold Xa1 (Step S13: YES), i.e., if it is determined that high acceleration is required by the driver, the procedure may proceed to Step S14 in which the acceleration assist mode is executed. As described above, in a case where the accelerator position Acp is increased greater than the starting threshold Xa1 while the adaptive speed mode is being executed, the ordinary assist mode is switched to the acceleration assist mode. This allows the motor generator 14 to be actively driven in order to accelerate the hybrid vehicle 11 at the time of exit from the corner, for example. Accordingly, it is possible to further enhance the acceleration responsivity of the hybrid vehicle 11 in the adaptive speed mode.

In Step S15, a predetermined reference time Tb may be multiplied by the coefficients k1 to k4 to set an execution time Xt. The execution time Xt may be a duration time of the acceleration assist mode. As illustrated in FIG. 14, the coefficient k1 may be set on the basis of the vehicle speed, and may be set to a larger value as the vehicle speed decreases. The coefficient k2 may be set on the basis of the road surface gradient, and may be set to a larger value as the downward gradient increases. The coefficient k3 may be set on the basis of the accelerator position, and may be set to a larger value as the accelerator position increases. The coefficient k4 may be set on the basis of the SOC, and may be set to a larger value as the SOC increases. That is, the execution time Xt may be set to a longer time as the vehicle speed decreases, as the downward gradient increases, as the accelerator position increases, or as the SOC is increases. In contrast, the execution time Xt may be set to a shorter time as the vehicle speed increases, as the upward gradient increases, as the accelerator position decreases, as the SOC decreases.

After the execution time Xt is set on the basis of the accelerator position and other factors as described above, the procedure may proceed to Step S16. In Step S16, it may be determined whether an elapsed time Tacc from the start of the acceleration assist mode is longer than the execution time Xt. If it is determined in Step S16 that the elapsed time Tacc is longer than the execution time Xt (Step S16: YES), i.e., if the acceleration assist mode has been executed for a longer time than the predetermined execution time Xt, the procedure may proceed to Step S17 in which the acceleration assist mode is stopped. Thereafter, the procedure may proceed to Step S18 in which it is determined whether the adaptive speed mode is to be stopped. If it is determined in Step S18 that the adaptive speed mode is to be stopped (Step S18: YES), the procedure may exit the routine. In contrast, if it is determined in Step S18 that the adaptive speed mode is to be maintained (Step S18: NO), the procedure may return to Step S11 in which the ordinary assist mode is selected. That is, in a case where the adaptive speed mode is to be maintained, the assist mode may be switched from the acceleration assist mode to the ordinary assist mode.

In contrast, if it is determined in Step S16 that the elapsed time Tacc is shorter than or equal to the execution time Xt (Step S16: NO), i.e., if the acceleration assist mode has not been executed for a longer time than the predetermined execution time Xt, the procedure may proceed to Step S19 in which the stopping threshold Xa2 is set on the basis of the vehicle speed and the road surface gradient. Thereafter, the procedure may proceed to Step S20 in which it is determined whether the accelerator position Acp is less than the stopping threshold Xa2. As illustrated in FIG. 15, the stopping threshold Xa2 may be set to a larger value as the vehicle speed increases, or as the upward gradient of the traveling road surface increases. That is, the stopping threshold Xa2 may be set to a larger value as the traveling resistance of the hybrid vehicle 11 increases. Note that the stopping threshold Xa2 may be less than the starting threshold Xa1 described above.

As illustrated in FIG. 12, if it is determined in Step S20 that the accelerator position Acp is greater than or equal to the stopping threshold Xa2 (Step S20: NO), i.e., if it is determined that acceleration is continuously requested by the driver, the procedure may return to Step S14 in which the acceleration assist mode is kept executed. In contrast, if it is determined in Step S20 that the accelerator position Acp is less than the stopping threshold Xa2 (Step S20: YES), i.e., if it is determined that high acceleration is no longer required by the driver, the procedure may proceed to Step S17 in which the acceleration assist mode is stopped. Thereafter, the procedure may proceed to Step S18 in which it is determined whether the adaptive speed mode is to be stopped.

As described above, in a case where the accelerator position Acp is increased greater than the starting threshold Xa1 while the adaptive speed mode is being executed, the ordinary assist mode may be switched to the acceleration assist mode. This allows the motor generator 14 to be actively driven at an appropriate timing. Accordingly, it is possible to further enhance the acceleration responsivity of the hybrid vehicle 11 in the adaptive speed mode. Further, in a case where the acceleration assist mode has been maintained for a longer time than the predetermined execution time Xt, the acceleration assist mode may be switched to the ordinary assist mode. In addition, if it is determined that the accelerator position Acp is decreased less than the stopping threshold Xa2, which is less than the starting threshold Xa1, while the acceleration assist mode is being executed, the acceleration assist mode may be switched to the ordinary assist mode. This allows the acceleration assist mode to end at an appropriate timing. Accordingly, it is possible to use the electric power energy of the battery module 53 in an efficient manner.

In addition, the starting threshold Xa1 on the basis of which a timing to start the acceleration assist mode is determined and the stopping threshold Xa2 on the basis of which a timing to stop the acceleration assist mode is determined may be set to larger values as the traveling resistance of the hybrid vehicle 11 increases. This allows the acceleration assist mode contributing to the acceleration responsivity to be executed at an appropriate timing. Note that, although the starting threshold Xa1 and the stopping threshold Xa2 may be set on the basis of the vehicle speed and the road surface gradient in the examples illustrated in FIGS. 13 and 15, these examples are non-limiting examples. The starting threshold Xa1 and the stopping threshold Xa2 may be set on the basis of only the vehicle speed or only the road surface gradient.

In addition, the execution time Xt on the basis of which the duration time of the acceleration assist mode is determined may be set to a longer time as the vehicle speed decreases or the downward gradient increases. This allows the acceleration assist mode to be maintained for a long time in a condition where the acceleration assist mode contributes to the acceleration responsivity. Accordingly, it is possible to enhance the acceleration responsivity in the adaptive speed mode. In addition, the execution time Xt on the basis of which the duration time of the acceleration assist mode is determined may be set to a longer time as the accelerator position or the SOC increases. This allows the acceleration assist mode to be maintained for a long time in a case where the driver requests high acceleration or where sufficient electric power energy is stored in the battery module 53. Accordingly, it is possible to enhance the acceleration responsivity in the adaptive speed mode.

In the example illustrated in FIG. 14, the coefficient k1 may be set to a larger value as the vehicle speed decreases, and the coefficient k2 may be set to a larger value as the downward gradient increases. However, this example is a non-limiting example. For example, as indicated by a broken line in FIG. 14, the coefficient k1 may be set to a larger value as the vehicle speed increases, and the coefficient k2 may be set to a larger value as the upward gradient increases. That is, the execution time Xt on the basis of which the duration time of the acceleration assist mode is determined may be set to a longer time as the vehicle speed or the upward gradient increases. For example, in a case where the battery module 53 has a large electric storage capacity, it is possible to actively expand the power-running region of the motor generator 14. Such a hybrid vehicle allows the acceleration assist mode to be maintained for a long time in a case where the vehicle speed is high or where the upward gradient is large. Accordingly, it is possible to enhance the acceleration responsivity in the adaptive speed mode.

In the above example embodiments, the execution time Xt on the basis of which the duration time of the acceleration assist mode is determined may be set on the basis of the vehicle speed, the road surface gradient, the accelerator position, and the SOC. However, these embodiments are non-limiting examples. For example, the execution time Xt may be set on the basis of only the vehicle speed, only the road surface gradient, only the accelerator position, or only the SOC. That is, the execution time Xt only has to be set on the basis of at least one of the vehicle speed, the road surface gradient, the accelerator position, or the SOC.

[Assist Mode Switching Control (Timing Chart)]

Figure 16:
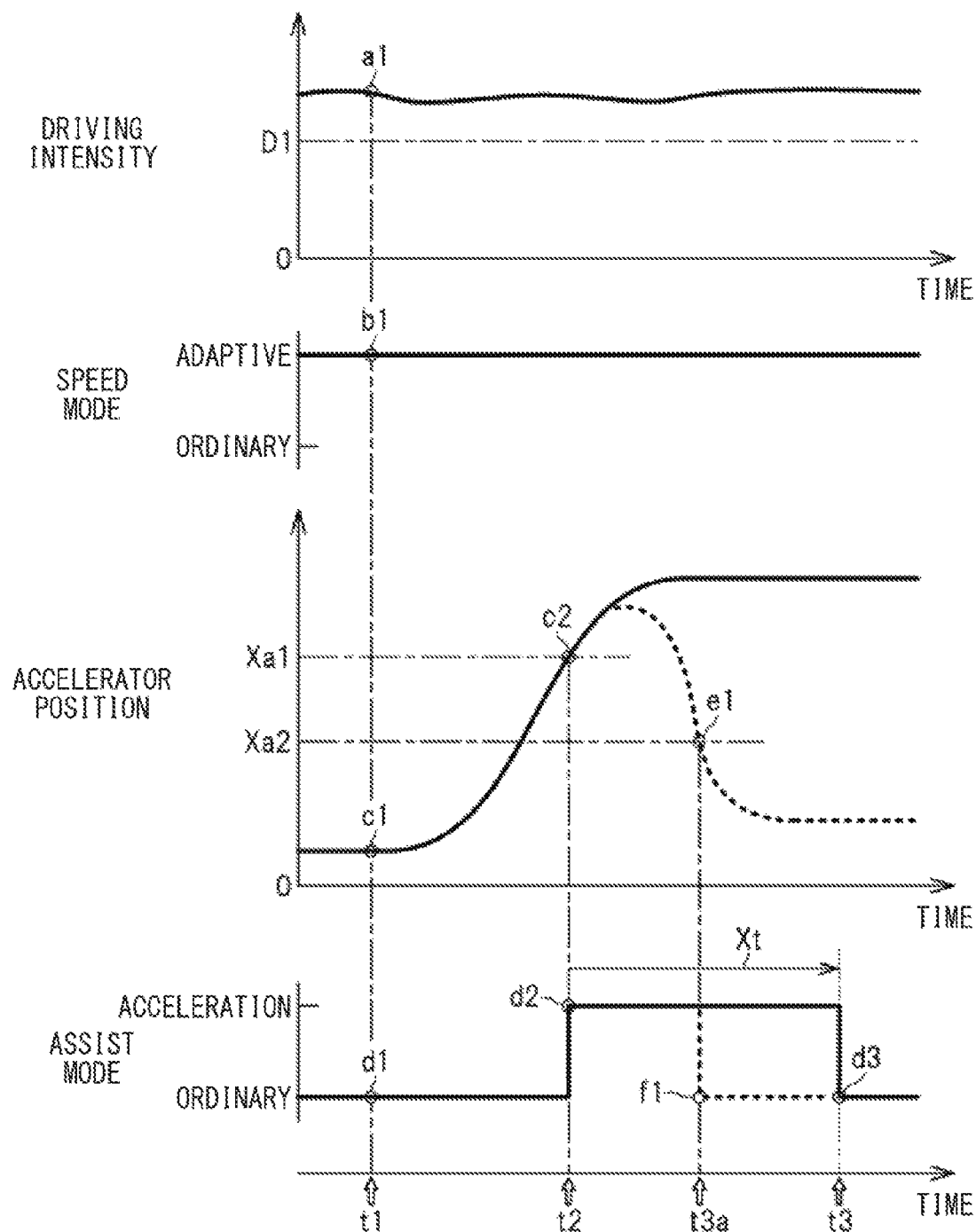
FIG. 16 is a timing chart illustrating an exemplary execution status of the assist mode switching control.

Next, the assist mode switching control described above is described with reference to a timing chart. FIG. 16 is a timing chart illustrating an exemplary execution status of the assist mode switching control. In a case where the driving intensity imparted by the driver is greater than a threshold D1 at a time t1 in FIG. 16, as indicated by reference sign a1, the adaptive speed mode may be executed as the speed mode, as indicated by a reference sign b1. In addition, in a case where the accelerator position is lower than the stopping threshold Xa2 at the time t1, as indicated by a reference sign c1, the ordinary assist mode may be executed at the time of acceleration of the hybrid vehicle 11, as indicated by a reference sign d1. Thereafter, at a time t2, the accelerator position may be increased greater than the starting threshold Xa1 by depressing the accelerator pedal, as indicated by a reference sign c2. This causes the assist mode to be switched from the ordinary assist mode to the acceleration assist mode, as indicated by a reference sign d2. Thereafter, at a time t3, the duration time of the acceleration assist mode may be longer than the execution time Xt. This causes the assist mode to be switched from the acceleration assist mode to the ordinary assist mode, as indicated by a reference sign d3. In a case where the accelerator position is decreased lower than the stopping threshold Xa2 by releasing the accelerator pedal at a time t3a, as indicated by a broken line in FIG. 16, while the adaptive speed mode and the acceleration assist mode are being executed, the assist mode may be switched from the acceleration assist mode to the ordinary assist mode, as indicated by a reference sign f1.

As described above, in a case where the accelerator position is increased greater than the starting threshold Xa1 while the adaptive speed mode is executed, the assist mode is switched from the ordinary assist mode to the acceleration assist mode. This allows the motor generator 14 to be actively driven at an appropriate timing. Accordingly, it is possible to further enhance the acceleration responsivity in the adaptive speed mode. Further, in a case where the acceleration assist mode has been executed for the predetermined execution time Xt, the assist mode is switched from the acceleration assist mode to the ordinary assist mode. Further, in a case where it is determined that the accelerator position Acp is decreased less than the stopping threshold Xa2, which is less than the starting threshold Xa1, while the acceleration assist mode is being executed, the assist mode is switched from the acceleration assist mode to the ordinary assist mode. This allows the acceleration assist mode to end at an appropriate timing. Accordingly, it is possible to use the electric energy of the battery module 53 in an efficient manner.

It is to be appreciated that the technology should not be limited to this example embodiments described above and may be modified in various ways without departing from the gist of the technology. Although the control system 60 may include the plurality of control units 34, 44, 55, 57, and 61 in the example embodiments described above, the control system 60 should not be limited to this example. For example, the control system 60 may include one control unit. In addition, although the motor generator 14 may be coupled to the input side of the continuously variable transmission 13 in the example illustrated in FIG. 2, this is a non-limiting example. Alternatively, the motor generator 14 may be coupled to an output side of the continuously variable transmission 13. Further, although both the engine 12 and the motor generator 14 may be coupled to the rear wheels 19r in the example illustrated in FIG. 2, this is a non-limiting example. For example, both the engine 12 and the motor generator 14 may be coupled to the front wheels 19f. Alternatively, the engine 12 may be coupled to the front wheels 19f, while the motor generator 14 may be coupled to the rear wheels 19r. Still alternatively, the engine 12 may be coupled to the rear wheels 19r, while the motor generator 14 may be coupled to the front wheels 19f. Still alternatively, the engine 12 may be coupled to both the front wheels 19f and the rear wheels 19r, or the motor generator 14 may be coupled to both the front wheels 19f and the rear wheels 19r. In the above description, the rear wheel 19r may serve as the first wheel, and the front wheel 19f may serve as the second wheel. However, this is a non-limiting example. Alternatively, the front wheel 19f may serve as the first wheel, and the rear wheel 19r may serve as the second wheel.

In the example embodiments illustrated in FIGS. 12 and 14, to set the execution time Xt of the acceleration assist mode, the coefficients k1 to k4 may be set on the basis of the vehicle speed, the accelerator position, and other parameters, and the reference time Tb may be multiplied by the coefficients k1 to k4. However, this is a non-limiting example. For example, a plurality of execution times may be set respectively on the basis of the vehicle speed, the road surface gradient, the accelerator position, and the SOC, and these execution times may be added to each other to set the execution time Xt. In addition, although the continuously variable transmission 13 may be used as a transmission in the example illustrated in FIG. 2, this is a non-limiting example. For example, a planetary gear automatic transmission or a parallel axis automatic transmission may be used as a transmission. Further, although the speed ratio may be continuously changed in the ordinary speed mode in the above description, this is a non-limiting example. Alternatively, the speed ratio may be changed in a stepwise manner in the ordinary speed mode. Further, although the speed ratio may be changed in a stepwise manner in the adaptive speed mode in the above description, this is a non-limiting example. Alternatively, the speed ratio may be continuously changed in the adaptive speed mode.

According to the vehicle control apparatus of any one of the example embodiments described above, the assist mode is switched to the second assist mode in a case where the amount of accelerator operation performed by the driver is increased greater than the starting threshold while the second speed mode is being executed. This allows the transmission and the electric motor to be appropriately controlled. Accordingly, it is possible to enhance the acceleration performance of the hybrid vehicle.

The control system 60 in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control system 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control system 60 illustrated in FIG. 2.

The invention claimed is:
1. A vehicle control apparatus comprising:
an electric motor coupled to a first wheel, a second wheel, or both of a hybrid vehicle;
a transmission;
an engine coupled to the first wheel, the second wheel, or both via the transmission; and
a control system including a processor and memory that are communicably coupled to each other, the control system being configured to control the engine, the electric motor, and the transmission, wherein
the control system is configured to:
execute a first speed mode or a second speed mode as a speed mode of the transmission on a basis of a driving operation performed by a driver who drives the hybrid vehicle;
set a speed ratio on a lower side in the second speed mode than in the first speed mode in a case where an accelerator operation performed by the driver is cancelled, such that an engine speed is maintained without decreasing, wherein the speed ratio is set to the lower side as a value of a ratio of the transmission increases, and the value of the ratio of the transmission indicates a ratio of a revolution speed of an input shaft of the transmission to a revolution speed of an output shaft of the transmission;
execute a first assist mode or a second assist mode as an assist mode in which the electric motor is brought into a power-running state, the second assist mode having greater power-running torque than the first assist mode; and
switch the assist mode to the second assist mode in a case where an amount of the accelerator operation performed by the driver is increased greater than a starting threshold while the second speed mode is being executed.

2. The vehicle control apparatus according to claim 1, wherein, while the second speed mode is being executed, the control system is configured to
switch the assist mode to the second assist mode in a case where the amount of the accelerator operation performed by the driver is increased greater than the starting threshold, and
switch the assist mode to the first assist mode in a case where an execution time of the assist mode elapses after the amount of the accelerator operation performed by the driver is increased greater than the starting threshold.

3. The vehicle control apparatus according to claim 1, wherein, while the second speed mode is being executed, the control system is configured to
switch the assist mode to the second assist mode in a case where the amount of the accelerator operation performed by the driver is increased greater than the starting threshold, and
switch the assist mode to the first assist mode in a case where the amount of the accelerator operation performed by the driver is decreased lower than a stopping threshold, the stopping threshold being less than the starting threshold.

4. The vehicle control apparatus according to claim 1, wherein the starting threshold is set to a larger value as a traveling resistance of the hybrid vehicle increases.

5. The vehicle control apparatus according to claim 2, wherein the starting threshold is set to a larger value as a traveling resistance of the hybrid vehicle increases.

6. The vehicle control apparatus according to claim 3, wherein the starting threshold is set to a larger value as a traveling resistance of the hybrid vehicle increases.

7. The vehicle control apparatus according to claim 2, further comprising
an electric power storage device coupled to the electric motor, wherein
the execution time is set on a basis of at least one of a vehicle speed, the amount of the accelerator operation, a road surface gradient, or a state of charge of the electric power storage device.

8. The vehicle control apparatus according to claim 1, wherein the control system is configured to:
calculate a target total torque based on the amount of the accelerator operation; and
control the engine and the electric motor such that a total output torque of the engine and the electric motor becomes the target total torque, and
wherein, while the first assist mode is being executed, the control system is configured to:
determine a first target engine torque such that a heat efficiency of the engine becomes a predetermined first value, wherein the first target engine torque is greater than zero and less than the target total torque;
in response to determining of the first target engine torque, determine a first target motor torque by subtracting the first target engine torque from the target total torque; and
control the engine to output the determined first target engine torque and control the electric motor to output the determined first target motor torque, and
wherein, while the second assist mode is being executed, the control system is configured to:
determine a second target motor torque to be a predetermined second value, wherein the predetermined second value is greater than zero and less than the target total torque;
in response to determining of the second target motor torque, determine a second target engine torque by subtracting the second target motor torque from the target total torque; and
control the engine to output the determined second target engine torque and control the electric motor to output the determined second target motor torque.

9. The vehicle control apparatus according to claim 8, wherein, while the second assist mode is being executed, the control system is configured to switch the assist mode from the second assist mode to the first assist mode in a case where a duration of execution of the assist mode reaches a predetermined time.

10. The vehicle control apparatus according to claim 9, wherein, while the second assist mode is being executed, the control system is configured to switch the assist mode from the second assist mode to the first assist mode in a case where the amount of the accelerator operation performed by the driver is decreased lower than a stopping threshold, the stopping threshold being less than the starting threshold.

11. The vehicle control apparatus according to claim 10, wherein the control system is configured to determine the starting threshold such that the starting threshold becomes greater as a traveling resistance of the hybrid vehicle becomes greater.

12. The vehicle control apparatus according to claim 10, wherein the control system is configured to determine the starting threshold such that the starting threshold becomes greater as a traveling resistance of the hybrid vehicle becomes greater.

13. The vehicle control apparatus according to claim 12, wherein the control system is configured to determine the predetermined time based on at least one of a vehicle speed, the amount of the accelerator operation, a road surface gradient, or a state of charge of an electric power storage device coupled to the electric motor.

* * * * *